US012785549B2

(12) United States Patent
Lee et al.

(10) Patent No.: US 12,785,549 B2
(45) Date of Patent: Nov. 3, 2026

(54) POWER FACTOR CORRECTION CIRCUIT SWITCHING METHOD FOR REDUCING LEAKAGE CURRENT

(71) Applicants: Hyundai Motor Company, Seoul (KR); Kia Corporation, Seoul (KR); Incheon University Industry Academic Cooperation Foundation, Incheon (KR)

(72) Inventors: Ye-Rin Lee, Hwaseong-si (KR); Dae-Woo Lee, Seoul (KR); Ki-Sang Lee, Hwaseong-si (KR); Ji-Han Lee, Hwaseong-si (KR); Youn-Sik Lee, Hwaseong-si (KR); Sang-Yun Lee, Incheon (KR); Won-Jun Kim, Incheon (KR); Geun-Ho Jang, Incheon (KR); Ye-Ji Hyeon, Incheon (KR); Seong-Wook Jeong, Incheon (KR); Han-Shin Youn, Incheon (KR); Dong-In Lee, Incheon (KR)

(73) Assignees: Hyundai Motor Company, Seoul (KR); Kia Corporation, Seoul (KR); Incheon University Industry Academic Cooperation Foundation, Incheon (KR)

( * ) Notice: Subject to any disclaimer, the term of this patent is extended or adjusted under 35 U.S.C. 154(b) by 217 days.

(21) Appl. No.: 18/883,117

(22) Filed: Sep. 12, 2024

(65) Prior Publication Data

US 2025/0202346 A1 Jun. 19, 2025

(30) Foreign Application Priority Data

Dec. 18, 2023 (KR) ........................ 10-2023-0184190

(51) Int. Cl.
*H02M 1/42* (2007.01)
*B60L 53/22* (2019.01)
*H02J 7/02* (2016.01)

(52) U.S. Cl.
CPC ........... *H02M 1/4208* (2013.01); *B60L 53/22* (2019.02); *H02J 7/02* (2013.01); *B60L 2210/30* (2013.01); *H02J 2207/20* (2020.01)

(58) Field of Classification Search
CPC ...... H02M 1/4208; H02J 7/02; H02J 2207/20; B60L 53/22; B60L 2210/30
See application file for complete search history.

(56) References Cited

U.S. PATENT DOCUMENTS

2015/0180356 A1* 6/2015 Norisada ................ B60L 53/14 363/17
2020/0235677 A1* 7/2020 Kataoka ............. H02M 7/5395

FOREIGN PATENT DOCUMENTS

KR 20170056797 A 5/2017

* cited by examiner

*Primary Examiner* — Rafael O De Leon Domenech
(74) *Attorney, Agent, or Firm* — Slater Matsil, LLP

(57) ABSTRACT

A power factor correction (PFC) circuit switching method can include coupling a PFC circuit and AC power to enable a controller to perform an initial charging operation on an output capacitor to firstly increase an output capacitor voltage, enabling the controller to secondly increase the output capacitor voltage in response to whether the firstly-increased output capacitor voltage reaches a first preset reference voltage, and enabling the controller to switch first and second poles configured in the PFC circuit at different duty ratios in response to whether the secondly-increased output capacitor voltage reaches a second preset reference voltage.

20 Claims, 8 Drawing Sheets

POWER FACTOR CORRECTION CIRCUIT SWITCHING METHOD FOR REDUCING LEAKAGE CURRENT

CROSS-REFERENCE TO RELATED APPLICATIONS

This application claims priority to Korean Patent Application No. 10-2023-0184190, filed on Dec. 18, 2023 which is incorporated herein by reference in its entirety.

TECHNICAL FIELD

The present disclosure relates to a power factor correction circuit switching technology.

BACKGROUND

Vehicle-mounted chargers typically include a power factor correction (PFC) stage and an isolated direct current/direct current (DC/DC) stage. A transformer in this isolated DC/DC stage causes power loss during the battery charging process, which is a limiting factor in reducing charging time. Furthermore, the transformer, along with an electrolytic capacitor, occupies a large volume within the vehicle-mounted charger, which is also a disadvantage in terms of volume reduction.

There is a need to develop and mount transformerless, non-isolated vehicle-mounted chargers to improve their commercialization. In general, these non-isolated vehicle-mounted chargers can offer the benefits of improved efficiency and volume reduction, but can suffer from large common-mode leakage currents compared to isolated vehicle-mounted chargers.

Furthermore, in non-isolated vehicle-mounted chargers, there is no electrical isolation between 'the PFC and DC/DC primary side' and 'the DC/DC secondary side and high-voltage battery' due to the removal of the transformer. As a result, a Y-capacitor of the 'DC/DC output side and battery' is projected onto the 'PFC and DC/DC primary side.' That is, a Y-capacitor voltage of the 'DC/DC output side and HV battery' fluctuates under the influence of the PFC stage, causing a common-mode leakage current at the AC input side of the vehicle-mounted charger.

On the other hand, electric vehicle supply equipment (EVSE) or residual current device (RCD) continuously detects the common-mode leakage current generated by the vehicle-mounted charger.

In this case, when the common-mode leakage current above a predetermined level is detected, the EVSE or RCD interrupts the power supply to stop battery charging of electric vehicles (EVs). According to NFPA 70 National Electrical Code (NEC) 208.8, restrooms, garages, etc. are applied with ground fault circuit interrupters (GFCIs). In this case, the leakage current is limited to approximately 5 mA per UL943 standard Class A.

Therefore, reducing the common-mode leakage current can be essential for the development and/or application of non-isolated vehicle-mounted chargers.

In addition, bridgeless PFC circuits and their control have been mainly applied to isolated vehicle-mounted chargers, but they are not necessarily applicable to non-isolated onboard chargers (OBCs). Generally, in the bridgeless PFC circuits, the low-speed switching pole center and the alternating current (AC) input terminal Neutral are connected to each other.

In addition, two switches that make up the low-speed switching pole alternately turn on and off every half cycle of the AC input. As a result, voltages of the PFC output and DC/DC output Y-capacitors appear in square waves that fluctuate rapidly every AC input half-cycle. This phenomenon is the same for interleaved bridgeless PFCs. As a result, a large spikey leakage current can be generated due to the rapid change in Y-capacitor voltage every input half-cycle.

Furthermore, as the DC/DC output Y-capacitor voltage does not have a constant value, a battery management system (BMS) determines insulation breakdown and stops the EV charging operation. Therefore, a non-isolated vehicle-mounted charger applied with a control other than the bridgeless PFC can be required.

In addition, although the inverter PFC does not have spikes in the Y-capacitor voltage, it does have low-frequency fluctuations in the AC input frequency. That is, the inverter PFC does not have the spike-like leakage current of the bridgeless PFC, but it does have low-frequency leakage current.

The low-frequency leakage current increases as the size of the output Y-capacitor increases, and when considering a non-isolated PFC, the high-voltage battery-side Y-capacitor is projected, resulting in a large leakage current. Therefore, it can be necessary to configure a non-isolated vehicle-mounted charger applied with a new inverter control rather than a typical inverter PFC.

SUMMARY

The present disclosure relates to a power factor correction circuit switching technology and, more particularly, to a power factor correction circuit switching method for reducing a common-mode leakage current in a non-isolated vehicle-mounted charger.

An embodiment of the present disclosure can provide a power factor correction (PFC) circuit switching method capable of applying inverter control while maintaining a bridgeless PFC circuit structure.

An embodiment of the present disclosure can provide a power factor correction (PFC) circuit switching method capable of improving a common-mode leakage current and earth leakage breaking problem of a non-isolated vehicle-mounted charger by applying an inverter PFC circuit control manner.

An embodiment of the present disclosure can provide a power factor correction (PFC) circuit switching method capable of applying inverter control while maintaining a bridgeless PFC circuit structure.

In an embodiment of the present disclosure, the PFC circuit switching method can include: coupling a PFC circuit and AC power to enable a controller to perform an initial charging operation on an output capacitor to firstly increase an output capacitor voltage; enabling the controller to secondly increase the output capacitor voltage in response to whether the firstly-increased output capacitor voltage reaches a first preset reference voltage; and enabling the controller to switch first and second poles configured in the PFC circuit at different duty ratios in response to whether the secondly-increased output capacitor voltage reaches a second preset reference voltage.

Firstly, increasing the output capacitor voltage may include electrically conducting anti-parallel diodes of first to fourth switching elements configured on the first and second poles to increase the output capacitor voltage.

Secondly, increasing the output capacitor voltage may include: enabling the controller to check whether the firstly-increased output capacitor voltage reaches the first preset reference voltage; and as a result of the check, if the firstly-increased output capacitor voltage reaches the first preset reference voltage, enabling the controller to alternately operate all of the first to fourth switching elements configured on the first and second poles at a variable duty ratio.

Switching the first and second poles at different duty ratios may include: enabling the controller to check whether the secondly-increased output capacitor voltage reaches the second preset reference voltage; and as a result of the check, if the secondly-increased output capacitor voltage reaches the second preset reference voltage, enabling the controller to be coupled to an alternating current (AC) input terminal Live to alternately operate the first and second switching elements configured on the first pole at the variable duty ratio.

Alternately operating the first and second poles at different duty ratios may include enabling the controller to be coupled to an AC input terminal Neutral to alternately operate the third and fourth switching elements configured on the second pole at a fixed preset duty ratio.

A control command for the first pole may be a 0° to 360° sinusoidal wave and a control command for the second pole may be a constant voltage.

A pole voltage of the first pole may be a 0° to 360° sinusoidal wave and a pole voltage of the second pole may be a constant voltage.

The pole voltage of the first pole may be a voltage between a first node on the first pole and a third node on an output terminal of the PFC circuit.

A pole voltage of the second pole may be a voltage between a second node on the second pole and a third node on an output terminal of the PFC circuit.

The output capacitor voltage firstly generated by the output terminal of the PFC circuit or the firstly generated output capacitor voltage may be the sum of a voltage of a top Y-capacitor configured on top of an output terminal of the second pole and a voltage of a bottom Y-capacitor configured on the bottom of the output terminal of the second pole.

The leakage current may be an AC input-side low-frequency common-mode leakage current and may be calculated using a Kirchhoff's voltage law (KVL) loop including the bottom Y-capacitor, an inductor connected to the second node formed on the second pole, the second node, a third node representing a center of the output terminal of the PFC circuit, and the bottom Y-capacitor.

The PFC circuit may be a bridgeless PFC circuit.

According to an embodiment of the present disclosure, the AC input low-frequency component, which is the main frequency component of the common-mode leakage current generated in an inverter power factor correction circuit, can be reduced so that the magnitude of the total common-mode leakage current may be reduced.

In addition, an embodiment of the present disclosure can prevent an earth leakage breakdown of a ground fault circuit interrupter (GFCI) and electric vehicle supply equipment (EVSE), and enable a normal charging operation of an on-board charger (OBC). Furthermore, an embodiment of the present disclosure can prevent an accident of electric shock to a user that may occur during charging of an electric vehicle (EV).

An embodiment of the present disclosure can achieve voltage balance of the Y capacitor and improve the problem of misdiagnosis of battery insulation breakdown in a battery management system (BMS).

An embodiment of the present disclosure can significantly contribute to the design and development, volume reduction, efficiency improvement, and user experience improvement of non-insulated vehicle-mounted chargers.

DETAILED DESCRIPTION OF ILLUSTRATIVE EMBODIMENTS

Figure 1:
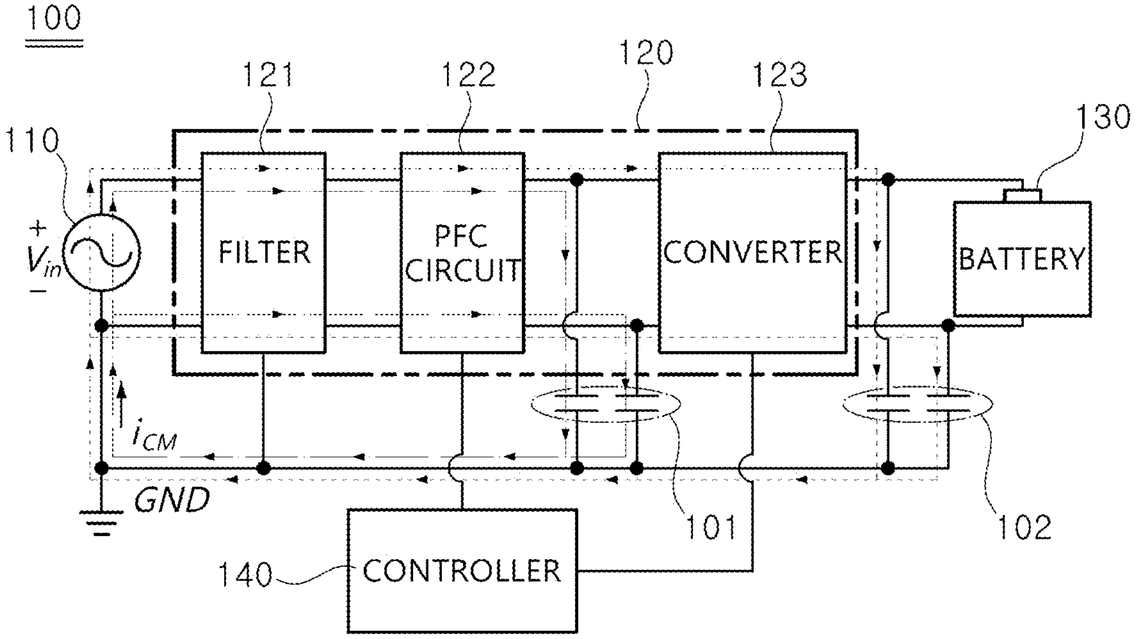
FIG. 1 is a block diagram illustrating the configuration of a power factor correction (PFC) circuit switching device according to an embodiment of the present disclosure.

The foregoing features and advantages will be further described in detail with reference to the accompanying drawings for example embodiments, so that one of ordinary skill in the art to which the present disclosure belongs can readily practice the technical ideas of the present disclosure. In describing example embodiments of the present disclosure, when it is determined that a detailed description of the known art related to the present disclosure would unnecessarily obscure the gist of the disclosure, the detailed description can be omitted.

Hereinafter, example embodiments of the present disclosure will be described in detail with reference to the accompanying drawings. Like reference numerals can be used to refer to identical or similar components throughout the drawings.

FIG. 1 is a block diagram illustrating the configuration of a power factor correction (PFC) circuit switching device 100 according to an embodiment of the present disclosure. Referring to FIG. 1, the PFC circuit switching device 100 may include a charger 120 that receives external alternating current (AC) power 110 and converts the AC power to direct current (DC) power, a battery 130 that is charged by the DC power, a PFC circuit 122, and a controller 140 that controls a converter 123.

The charger 120 may include a filter 121 that can remove disturbing electromagnetic waves from the AC power $V_{in}$, the PFC circuit 122 that can convert the AC power to DC power and corrects power losses during the conversion process, and the converter 123 that can boost or drop the DC power.

The filter 121 can function to remove disturbing electromagnetic waves from the AC power $V_{in}$. An example of a disturbing electromagnetic wave can be electromagnetic interference (EMI). Types of electromagnetic interference may include conducted emissions and radiated emissions.

The PFC circuit 122 can function to convert the AC power from which the disturbing electromagnetic waves are removed into DC power and reduce the power loss during this conversion process. In other words, the PFC circuit 122 can have an inverter configuration that performs the function of converting AC power into DC power and a configuration that improves the power factor. In other words, the PFC circuit 122 may be an inverter type PFC.

The converter 123 can perform a function of boosting or dropping the DC power. The converter 123 may be a DC-DC converter.

The battery 130 can include serial and/or parallel configuration-battery cells (not shown), which may be high-voltage (HV) battery cells for electric vehicles (EVs), such as nickel-metal battery cells, lithium-ion battery cells, lithium-polymer battery cells, lithium-sulfur battery cells, sodium-sulfur battery cells, all-solid-state battery cells, and the like.

Generally, a high-voltage battery can refer to a battery that is used as a power source to activate an electric vehicle and has a high voltage of 100V or more. However, the battery is not limited thereto, but may also be a low-voltage battery (e.g., less than 100V).

The controller 140 can perform a function of controlling the PFC circuit 122, the converter 123, and the like. In particular, the controller 140 can perform switching control to control a switching operation for the PFC circuit 122 to reduce a common-mode leakage current. The controller 140 may include a microprocessor, a microcomputer, a modulation drive circuit that generates a modulation signal for switching, and the like. The modulation signal may be a pulse width modulation (PWM) signal, a pulse frequency modulation (PFM) signal, or the like.

A first output capacitor 101 and a second output capacitor 102 can be Y=Y capacitors connected to the ground GND and the output side of the PFC circuit 122/converter 123, respectively. In this case, a large common-mode leakage current $i_{CM}$ can be generated. In an embodiment of the present disclosure, for reducing such a large common-mode leakage current $i_{CM}$, the controller 140 can perform switching control over the PFC circuit 122.

Figure 2:
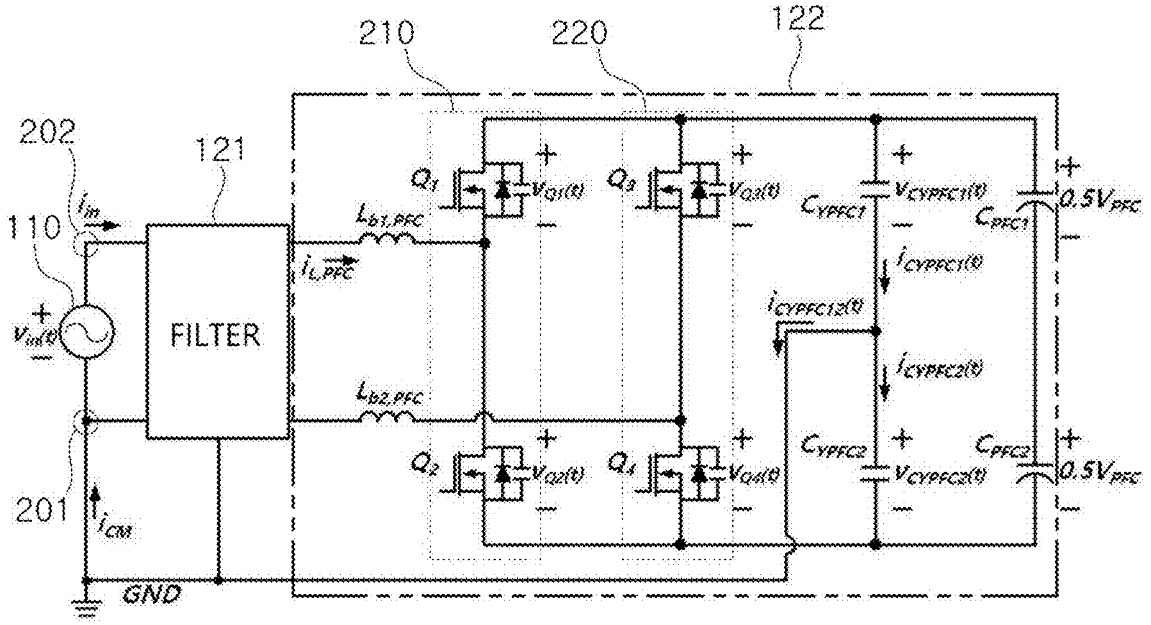
FIG. 2 is a circuit diagram illustrating a PFC circuit with a filter illustrated in FIG. 1, according to an embodiment of the present disclosure.

FIG. 2 is a circuit diagram illustrating a PFC circuit with the filter 121 illustrated in FIG. 1. Referring to FIG. 2, the filter 121 can be connected to an external AC power source 110. In other words, both ends of the filter 121 can be connected to an AC input terminal Neutral 201 and an AC input terminal Live 202. The PFC circuit 122 can be a bridgeless PFC circuit.

First and second inductors $L_{b1,PFC}$ and $L_{b2,PFC}$ can be connected to the output terminal of the filter 121. A current can flow in the first inductor $L_{b1,PFC}$. The first inductor $L_{b1,PFC}$ can be connected to a first pole 210, and the second inductor $L_{b2,PFC}$ can be connected to a second pole 220. On the first pole 210, a first switching element $Q_1$ and a second switching element $Q_2$ can be connected in series at a predetermined or set interval, and on the second pole 220, a third switching element $Q_3$ and a fourth switching element $Q_4$ can be connected in series at a predetermined or set interval. The first pole 210 and the second pole 220 can be configured in parallel.

The first to fourth switching elements $Q_1$ to $Q_4$ can mainly use power metal oxide silicon field effect transistors (MOSFETs), but may also use field effect transistors (FETs), insulated gate bipolar mode transistors (IGBTs), and the like. Voltages $V_{Q1}(t)$, $V_{Q1}(t)$, $V_{Q1}(t)$, and $V_{Q1}(t)$ can be applied across the capacitors of the first to fourth switching elements $Q_1$ to $Q_4$, respectively. The first to fourth switching elements $Q_1$ to $Q_4$ can be configured with antiparallel diodes. Through the electrical conduction of these antiparallel diodes, the output capacitor voltage of the output capacitor 101 can increase.

On the output terminal of the second pole 220, a top Y-capacitor $C_{YPFC1}$ can be configured on top the output terminal of the second pole 220 and a bottom Y-capacitor $C_{YPFC2}$ can be configured at the bottom of the output terminal of the second pole 220, and a top output capacitor $C_{PFC1}$ and a bottom output capacitor $C_{PFC2}$ can be configured in parallel to the top Y-capacitor $C_{YPFC1}$ and the bottom Y-capacitor $C_{YPFC2}$. The centers of the top Y-capacitor $C_{YPFC1}$ and bottom Y-capacitor $C_{YPFC2}$ can be connected to the ground GND. This can allow a common-mode leakage current $i_{CYPFC12}(t)$ to flow from the centers to the AC input side.

The top Y-capacitor $C_{YPFC1}$ and bottom Y-capacitor $C_{YPFC2}$ can be applied with voltages $V_{CYPFC1}(t)$ and $V_{CYPFC2}(t)$, respectively. Current $i_{YPFC1}(t)$ and $i_{CYPFC2}(t)$ can flow along the top Y-capacitor $C_{YPFC1}$ and bottom Y-capacitor $C_{YPFC2}$, respectively.

The top output capacitor $C_{PFC1}$ and the bottom output capacitor $C_{PFC2}$ can be polarized capacitors, which can output an output voltage (e.g., 0.5 $V_{PFC}$).

Figure 3:
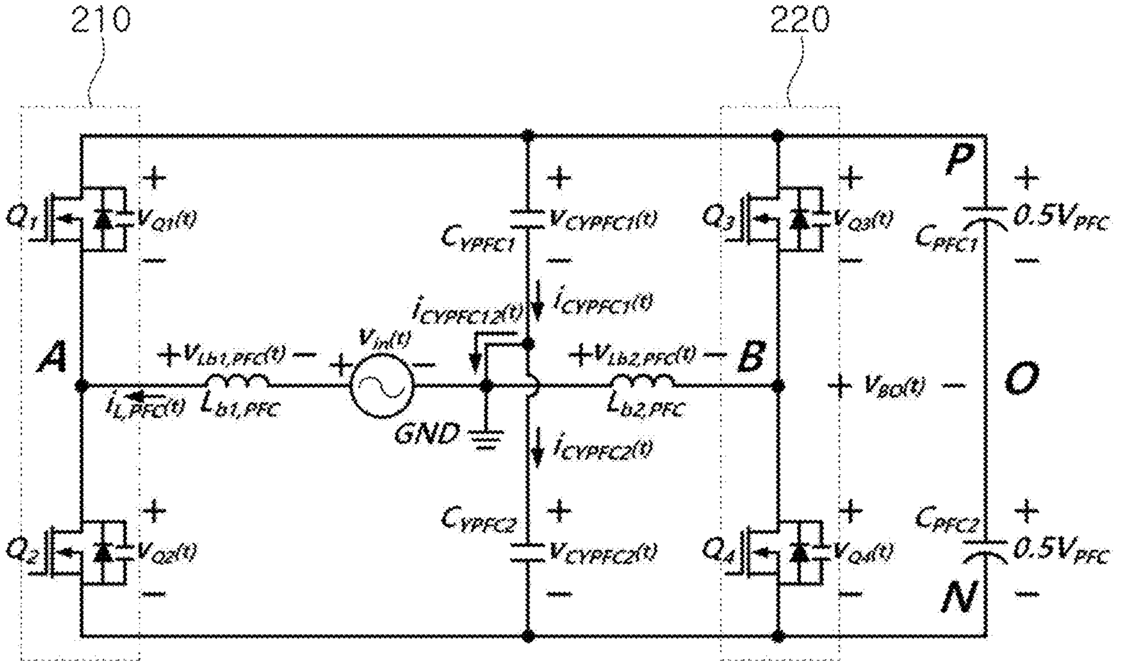
FIG. 3 is a circuit diagram illustrating a PFC circuit without the filter illustrated in FIG. 1, according to an embodiment of the present disclosure.

FIG. 3 is a circuit diagram illustrating a PFC circuit 122 without the filter 121 illustrated in FIG. 1. Referring to FIG. 3, the filter 121 can be removed from FIG. 2 for convenience of interpretation and an external AC power $V_{in}(t)$ can be connected to the first pole 210 and the second pole 220 via the first and second inductors $L_{b1,PFC}$ and $L_{b2,PFC}$, respectively. The first inductor $L_{b1,PFC}$ can be connected to a first node A of the first pole 210, and the second inductor $L_{b2,PFC}$ can be connected to a second node B of the second pole 220. It can be also assumed that a third node O, a fourth node P, and a fifth node N representing the center, top, and bottom, respectively, at the output terminal of the bridgeless PFC circuit 122 can be virtually present.

Figure 4:
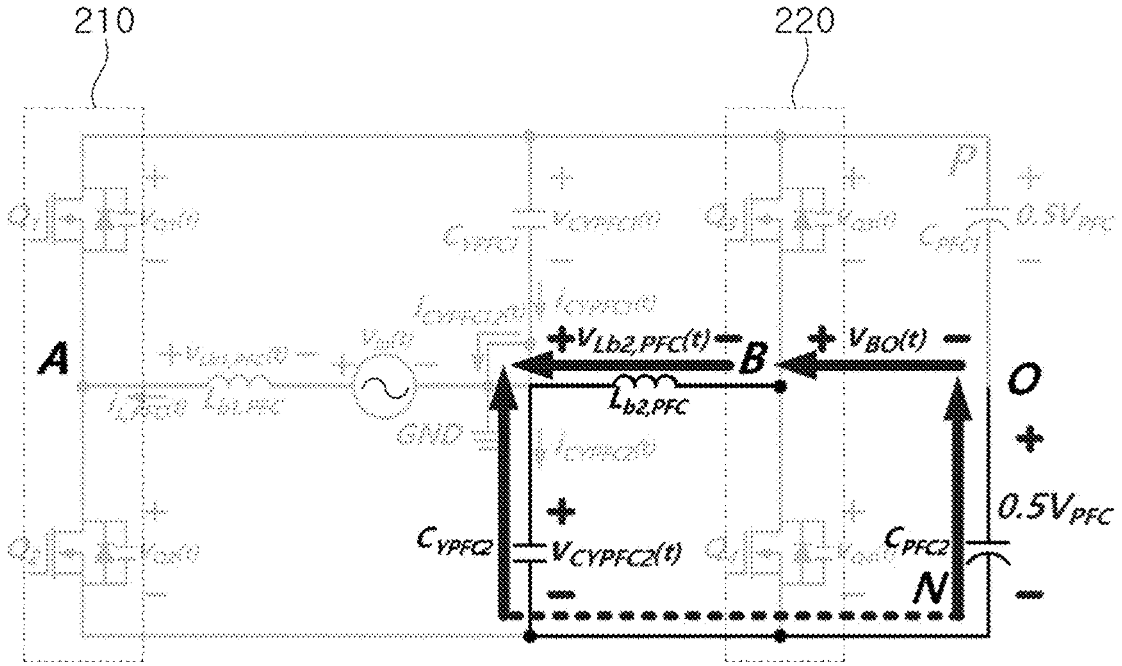
FIG. 4 is a diagram illustrating a Kirchhoff's voltage law (KVL) loop for calculating a Y capacitor voltage in FIG. 3, according to an embodiment of the present disclosure.

FIG. 4 is a diagram illustrating a Kirchhoff's voltage law (KVL) loop for calculating a Y capacitor voltage in FIG. 3. Referring to FIG. 4, the KVL loop can include a loop of $C_{YPFC2}$-$L_{b2,PFC}$-second node B-third node O-$C_{PFC2}$. In other words, the KVL loop can be a rectangular loop formed along the arrows and dotted lines. Additionally explaining, the KVL loop can calculate the voltage relationships between respective elements in the rectangular loop area.

$$① < v_{Lb2,PFC}(t) >_{TS} = o\ \mathrm{V}$$

$$② < v_{CYPFC2}(t) >_{TS} = 0.5\ V_{PFC} + < v` >_{Ts} + < v_{Lb2,PFC}(t) >_{Ts} = 0.5\ V_{PFC}$$

(where $v_{BO}(t)$ is the voltage between the third node $O$ and the second node $B$)

-continued $$③ < v_{CYPFC1}(t) >_{Ts} = V_{PFC} - < v_{CYPFC2}(t) >_{Ts} = 0.5\ V_{PFC}$$

$$④ i_{CM.LowFreq} \approx i_{CYPFC12}(t) = i_{CYPFC1}(t) - i_{CYPFC2}(t) \text{(where } i_{CM.LowFreq} \text{ is the AC input side low frequency common-mode leakage current)}$$

$$⑤ C_{YPFC1}\frac{d < v_{CYPFC1}(t) >}{dt} - C_{YPFC2}\frac{d < v_{CYPFC2}(t) >}{dt} = 0A$$

In the above formulas, the arrow brackets ($< >_{Ts}$) mean the average symbol to indicate the average of the internal variables, and in the following formulas, the average symbol (< >) is used for simplicity.

Above equation ① means the average value of $v_{1b2,PFC}$ (t), which is the voltage of the inductor $L_{b2,PFC}$ in the rectangular area by the KVL loop. The average voltage of $V_{Lb2,PFC}(t)$ is 0 V due to the basic nature of the inductor element.

Above equation ② means that the voltage relationship of the rectangular area is calculated considering the above ①. The voltage relationship is calculated along the direction of the respective arrows from the left and right of the dotted line.

Additionally given, the voltage relationship is equal to the sum of the three arrow voltages 0.5 $V_{PFC}$, $v_{BO}(t)$, and $v_{Lb2.PFC}(t)$ starting from the fifth node N on the right and passing through the third node O and the second node B.

These three voltages can be averaged, and can be calculated while showing the average symbol (< >) together. However, 0.5 $V_{PFC}$ can be always a constant value, so there is no need to show the average symbol. Because $v_{BO}(t)$ and $v_{Lb2.PFC}(t)$ can be 0 V, $<v_{CYPFC2}(t)>$ is finally equal to 0.5 $V_{PFC}$.

In the case of equation ③ above, the voltage from the fifth node N to the fourth node P is the sum of the two $V_{PFC}$ because there are two 0.5 $V_{PFC}$. However, the voltage from the fifth node N to the fourth node P is also equal to the sum of $V_{CYPFC1}(t)$ and $V_{CYPFC2}(t)$. The mathematical expression for this is as follows: $V_{PFC}=<v_{CYPFC1}(t)>_{Ts}+<v_{CYPFC2}(t)>_{Ts}$.

In the above expression, $<v_{CYPFC2}(t)>_{Ts}$ is transposed, and in the previous expression, $<v_{CYPFC2}(t)>_{Ts}$ is 0.5 $V_{PFC}$, so the mathematical expression shown in equation ③ above is induced.

In the case of equation ④ above, the low-frequency common-mode leakage current $i_{CM.LowFreq}$ is approximately equal to $i_{CYPFC12}(t)$. Meanwhile, the low-frequency common-mode leakage current $i_{CM.LowFreq}$ is $i_{CYPFC1}(t)$ minus $i_{CYPFC2}(t)$ according to the direction of the current arrow.

In the case of equation ⑤ above, $i_{CYPFC1}(t)$ and $i_{CYPFC2}$ (t) are the currents flowing in the first Y-capacitor $C_{YPFC1}$ and the second Y-capacitor $C_{YPFC2}$, and the current flowing in the capacitor may be calculated according to the basic differential formula of a capacitor, i=C (dv/dt). The low-frequency common-mode leakage current $i_{CM.LowFreq}$ is expressed as shown in equation ⑤ above, with the averaging symbol (<x>) shown together to consider the calculation with the average voltage.

In the case of equation ⑤ above, $v_{CYPFC1}(t)$ and $v_{CYPFC2}$ (t) can be a constant of 0.5 $V_{PFC}$, so they become zero when applied with the differential operation. Therefore, the low-frequency common-mode leakage current $i_{CM.LowFreq}$ can become 0 A.

Figure 5A:
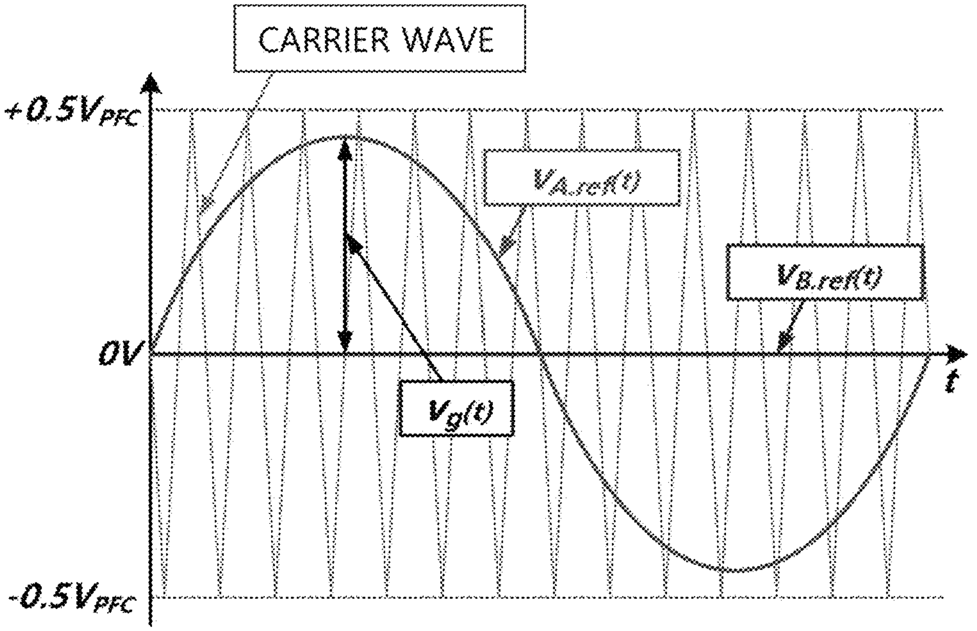
FIGS. 5A and 5B are waveform diagrams of a pole reference voltage and an individual pole voltage according to an embodiment of the present disclosure.
Figure 5B:
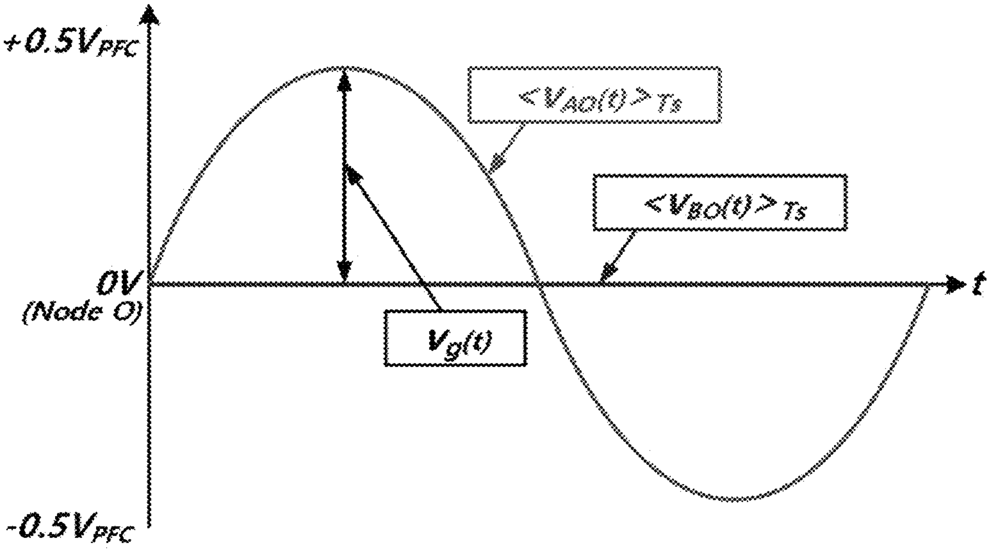

FIGS. 5A and 5B are waveform diagrams of a pole reference voltage and an individual pole voltage according to an embodiment of the present disclosure. More specifically, FIG. 5A is a waveform diagram of the pole reference voltage, and FIG. 5B is a waveform diagram of the individual pole voltage.

Referring to FIG. 5A, the first and second poles 210 and 220 share a same carrier wave, and a control command $V_{A.ref}(t)$ for the first pole 210 is a 0° to 360° sinusoidal wave, varying between +0.5 $V_{PFC}$ and −0.5 $V_{PFC}$. Further, the control command $V_{A.ref}(t)$ has a magnitude $V_g(t)$ from 0 V to the floor of the sinusoid wave. The control command $V_{B.ref}(t)$ for the second pole 220 has a constant voltage (e.g., 0 V).

Thus, the control command $V_{A.ref}(t)$ for the first pole 210 and the control command $V_{B.ref}(t)$ for the second pole 220 can have a phase difference of 90° with each other.

Referring to FIG. 5B, the pole voltage $<V_{AO}(t)>_{Ts}$ of the first pole 210 is a sinusoidal wave from 0° to 360°, varying between +0.5 $V_{PFC}$ and −0.5 $V_{PFC}$. Further, the pole voltage $<V_{AO}(t)>_{Ts}$ of the first pole 210 has a magnitude $V_{g(t)}$ from 0V to the floor of the sinusoidal wave. The pole voltage $<V_{BO}(t)>_{Ts}$ of the second pole 220 has a constant voltage (e.g., 0 V).

The pole voltage $<V_{AO}(t)>_{Ts}$ of the first pole 210 is a voltage between the first node (A in FIG. 3) on the first pole 210 and the third node (O in FIG. 3) on the output terminal of the PFC circuit 122, the pole voltage $<V_{BO}(t)>_{Ts}$ of the second pole 220 is a voltage between the second node (B in FIG. 3) on the second pole 220 and the third node (O in FIG. 3) on the output terminal of the PFC circuit 122.

Figure 6:
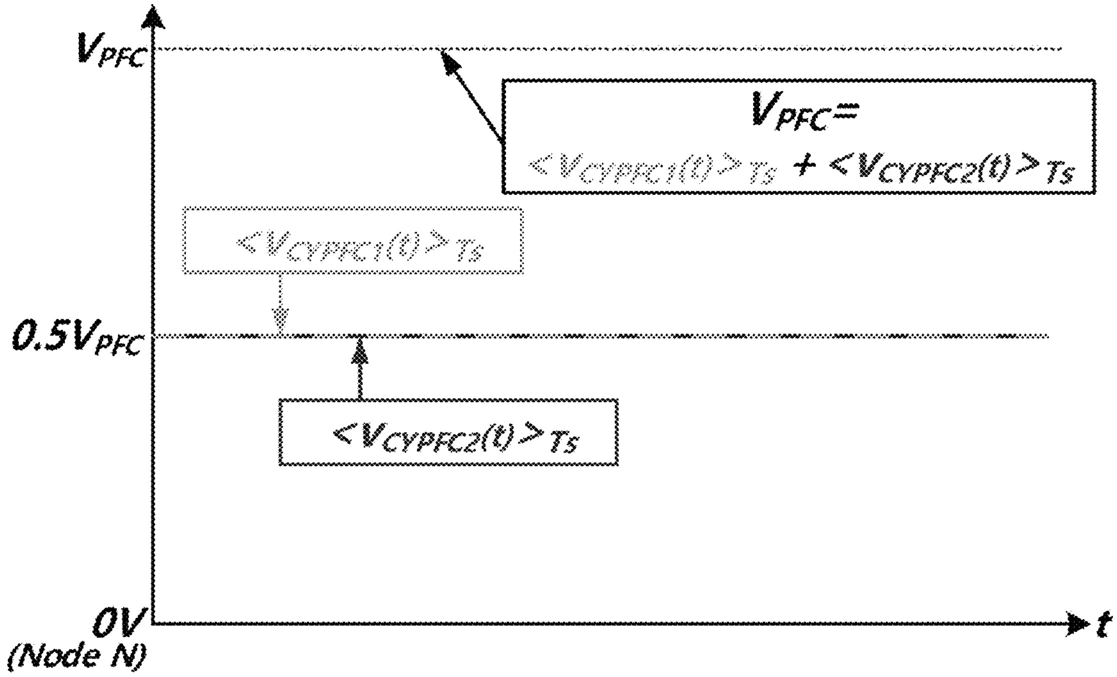
FIG. 6 is a waveform diagram of an output voltage of a Y-capacitor according to an embodiment of the present disclosure.

FIG. 6 is a waveform diagram of an output voltage of a Y-capacitor according to an embodiment of the present disclosure. Referring to FIG. 6, an output voltage of the first output capacitor 101 connected to the output terminal of the PFC circuit 122 is shown. The output capacitor voltage $V_{PFC}$ is the sum of the voltage $V_{CYPFC1}(t)$ of the top Y-capacitor $C_{YPFC1}$ and the voltage $V_{CYPFC2}(t)$ of the bottom Y-capacitor $C_{YPFC2}$. In other words, the voltage $v_{CYPFC1}$ (t) of the top Y-capacitor $C_{YPFC1}$ and the voltage $V_{CYPFC2}(t)$ of the bottom Y-capacitor $C_{YPFC2}$ are each 0.5 $V_{PFC}$. The output capacitor voltage $V_{PFC}$ is an increased voltage from the fifth node (N in FIG. 3), which is 0 V.

Figure 7A:
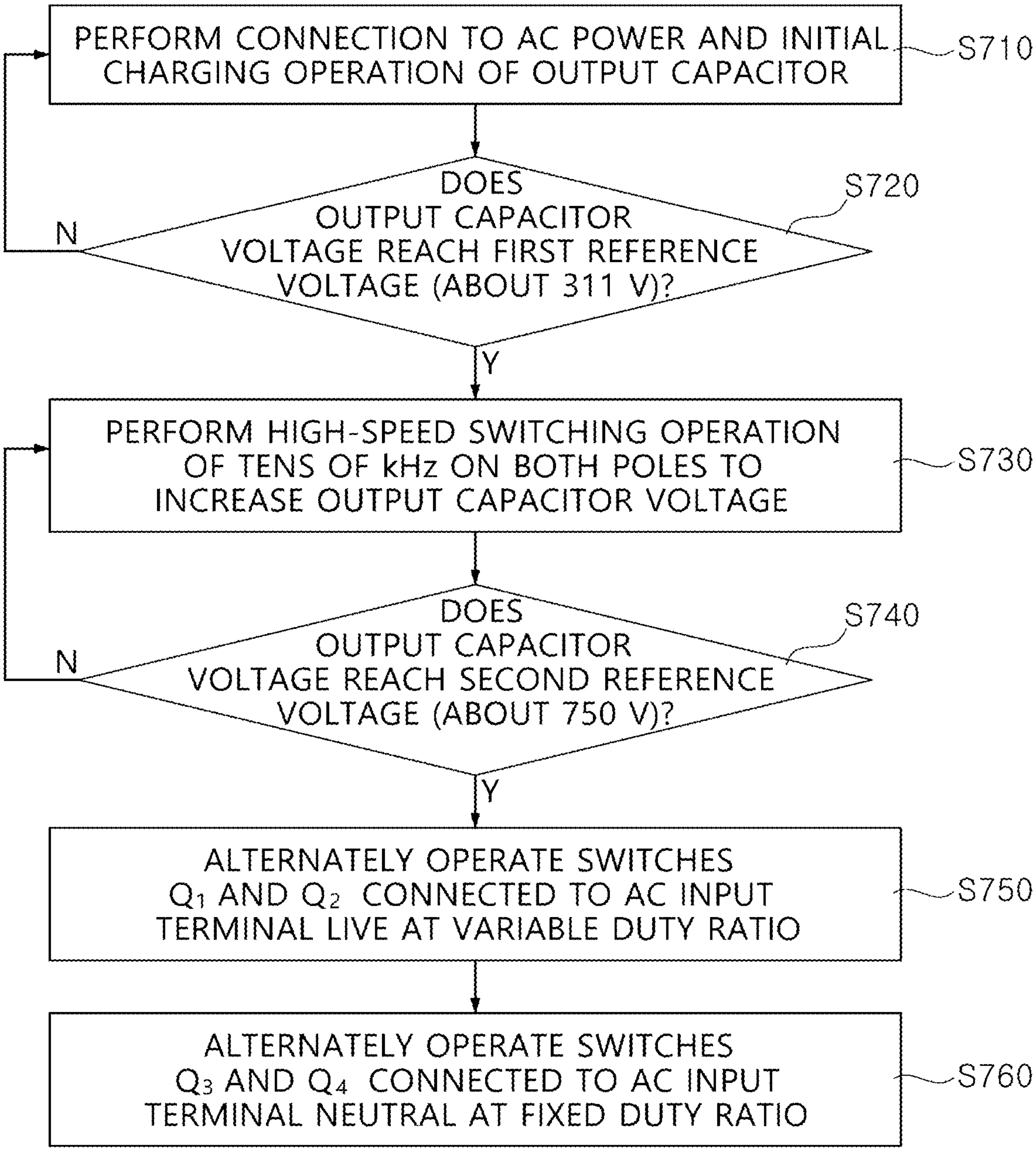
FIG. 7A is a flow diagram illustrating a process of controlling a PFC circuit according to an embodiment of the present disclosure.

FIG. 7A is a flow diagram illustrating a process of controlling a PFC circuit 122 according to an embodiment of the present disclosure. Referring to FIG. 7A, when the external AC power 110 is connected to the charger 120, the controller 140 can perform an initial charging operation of the output capacitor 101 to firstly increase the output capacitor voltage in operation S710. The output capacitor 101 includes a top Y-capacitor $C_{YPFC1}$ and a bottom Y-capacitor $C_{YPFC2}$. At this time, the first and second poles 210 and 220 are not switched. However, the antiparallel diodes of the first to fourth switching elements $Q_1$ to $Q_4$ are electrically conducted, so that the output capacitor voltage is firstly increased. The magnitude of the increased output capacitor voltage can be about 311 V.

Then, the controller 140 can check whether the firstly increased output capacitor voltage reaches a first reference voltage (e.g., about 311 V) in operation S720.

As a result of checking in operation S720, if the firstly increased output capacitor voltage reaches the first reference voltage (e.g., about 311 V), the controller 140 can perform a high-speed switching operation of tens of kHz for both the first and second poles 210 and 220 of the PFC circuit 122 to secondly increase the output capacitor voltage in operation S730. Advantageously, the first to fourth switching elements $Q_1$ to $Q_4$ configured on the first and second poles 210 and 220 can be all alternately operated at a variable duty ratio.

In contrast, as a result of checking in operation S720, if the output capacitor voltage does not reach the first reference voltage (e.g., about 311 V), operations S710 to S720 can be performed again.

After operation S730, the controller 140 can check whether the secondly increased output capacitor voltage reaches a second reference voltage (e.g., about 750 V) in operation S740.

As a result of checking in operation S740, if the secondly increased output capacitor voltage reaches the second reference voltage (e.g., about 750 V), the controller 140 can operate to switch the configured first and second poles 210 and 220 at different duty ratios in operations S750 and S760.

Additionally given, the controller 140 can alternately operate the first and second switching elements $Q_1$ and $Q_2$ connected to the AC input terminal Live 202 at a variable preset duty ratio in operation S750. That is, in the case of the first pole 210, variable duty control can be used.

Further, the controller 140 can alternately operate the third and fourth switching elements $Q_3$ and $Q_4$ connected to the AC input terminal Neutral 201 at a fixed preset duty ratio in operation S760. That is, for the second pole 220, a 0.5 fixed duty ratio-control operation can be applied.

Operations S750 and S760 are separated for illustrative purposes, but operations S750 and S760 may be carried out simultaneously.

On the other hand, as a result of checking in operation S740, if the secondly increased output capacitor voltage does not reach the second reference voltage, operations S730 to S740 can be performed again.

Figure 7B:
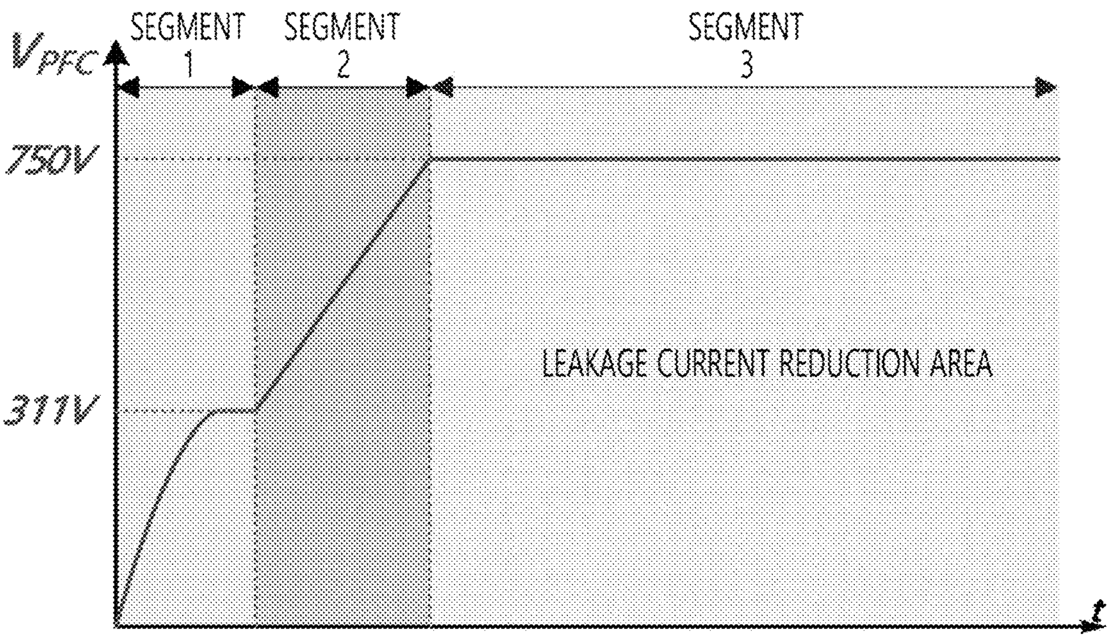
FIG. 7B is a diagram illustrating an operation segment according to an embodiment of the present disclosure.

FIG. 7B is a diagram illustrating an operation segment according to an embodiment of the present disclosure. The first operating segment (segment 1) corresponds to operation S710, the second operating segment (segment 2) corresponds to operation S730, and the third operating segment (segment 3) corresponds to operations S750 and S760.

Figure 8:
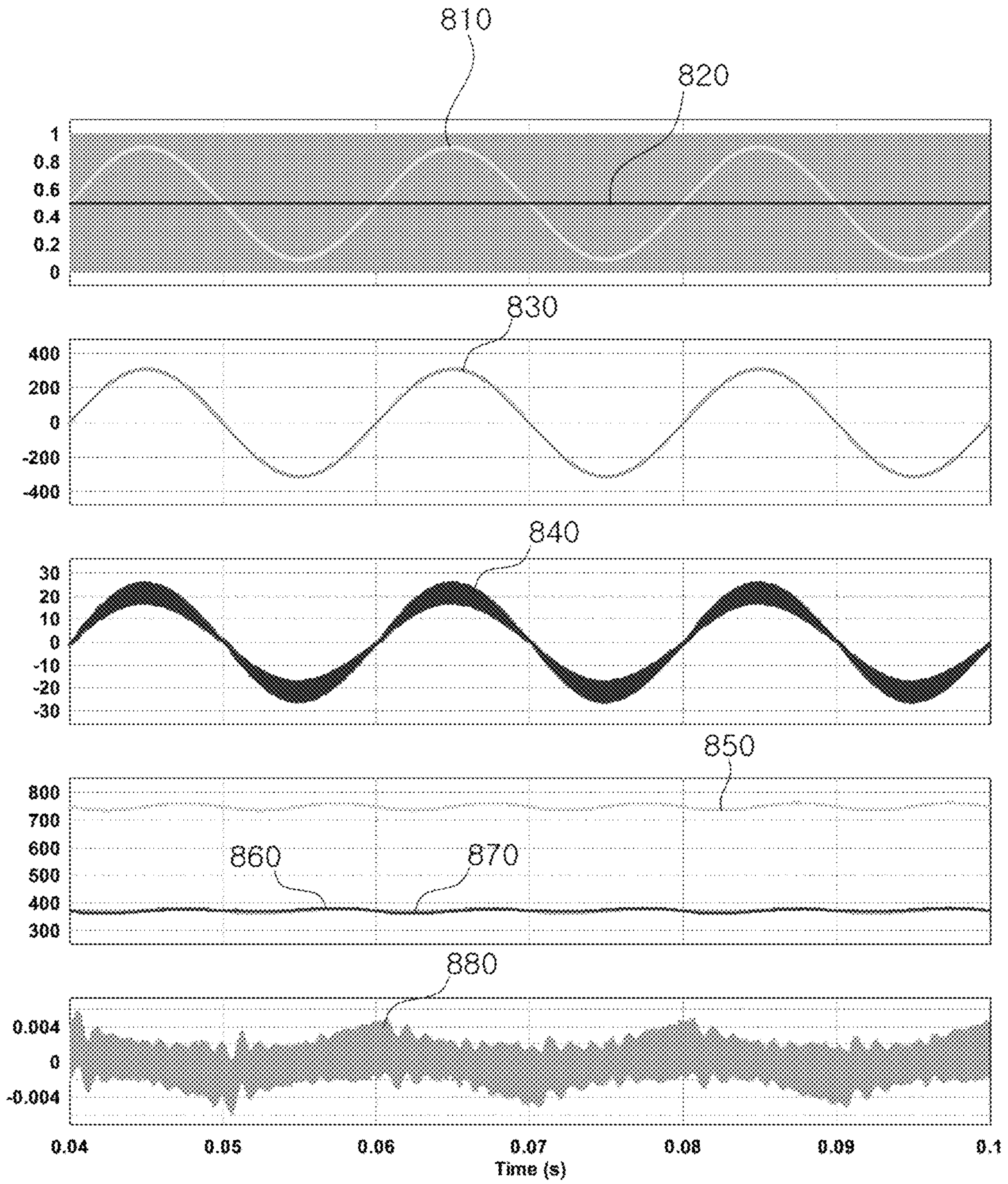
FIG. 8 is a graph illustrating a leakage current simulation embodiment of a PFC circuit according to an embodiment of the present disclosure.

FIG. 8 is a graph illustrating a leakage current simulation embodiment of a PFC circuit according to an embodiment of the present disclosure. Referring to FIG. 8, there are shown, from top to bottom, command waveforms 810 and 820 representing command voltages for the first pole 210 and command voltages for the second pole, an input voltage waveform 830 representing an input voltage $V_{in}$, an inductor current waveform 840 representing an inductor current, an output voltage waveform 850, 860, and 870 representing output capacitor voltages $V_{PFC}$, a voltage across a bottom Y-capacitor $C_{YPFC2}$, and a voltage across a top Y-capacitor $C_{YPFC1}$, and a current waveform 880 representing a leakage current $i_{cm}$.

The leakage current effective value in FIG. 8 is about 2.6 mArms, indicating that an on-board charger (OBC) is performing a charging operation normally. Furthermore, the waveform of the leakage current $i_{cm}$ in FIG. 8 shows that the low-frequency leakage current is greatly reduced, and only the high-frequency component is present.

In the case of FIG. 8, the main parameters of the example simulation are as follows.

TABLE 1

| Parameters | Value |
|---|---|
| Input voltage ($V_{in}$) | 220 $V_{ac}$ |
| Input voltage frequency ($F_{line}$) | 50 Hz |
| Output voltage ($V_{PFC}$) | 750 $V_{DC}$ |
| Inductor ($L_{b1, PFC}$ & $L_{b2, PFC}$) | 180 μH |
| Output capacitor ($C_{PRC1}$ & $C_{PFC2}$) | 1.1 mF |

TABLE 1-continued

| Parameters | Value |
|---|---|
| Switching frequency | 50 kHz |
| Output Y-capacitor ($C_{YPFC1}$ & $C_{YPFC2}$) | 100 nF |

The frequency leakage component calculation is as follows:

$$i_{CM.LowFreq} \approx i_{CYPFC12}(t) = 0.5_{vin.max}\omega_{line}(C_{YPFC1} + C_{YPFC2})\cos(\omega_{line}t) = o[A].$$

Figure 9:
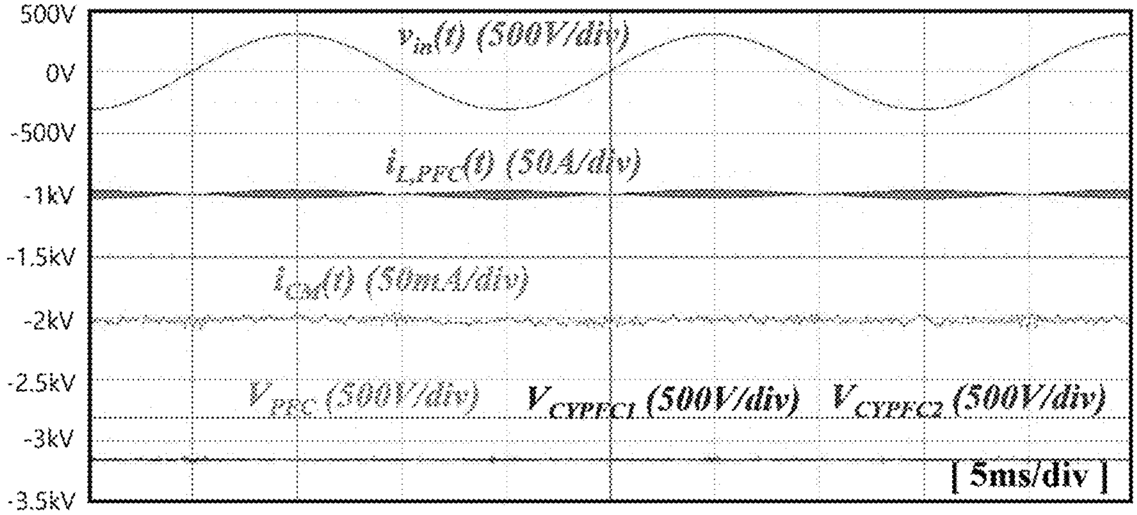
FIGS. 9 and 10 are graphs illustrating experimental results according to an embodiment of the present disclosure.
Figure 10:
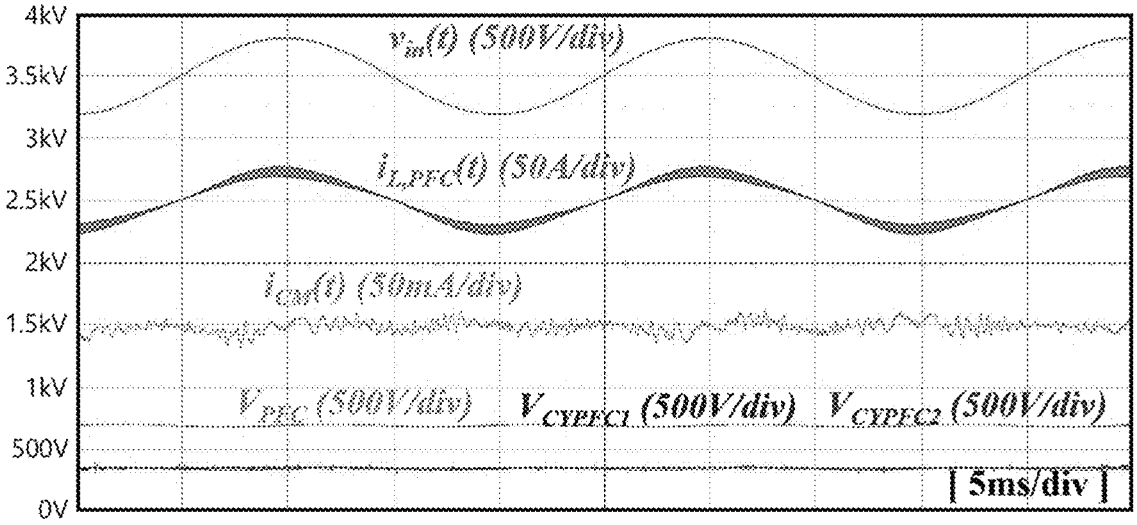

FIGS. 9 and 10 are graphs illustrating experimental results according to an embodiment of the present disclosure. Referring to FIGS. 9 and 10, the experimental condition is that the output Y-capacitor is 100 nF, for example.

FIG. 9 is a no-load operation waveform, and FIG. 10 is a 3.3 kW operation waveform. In FIG. 9, there is no low-frequency component in the leakage current $i_{CM}$. In the case of FIG. 10, although the high-frequency component of the leakage current $i_{CM}$ increases as the load increases, the low-frequency reduction performance may be sufficiently confirmed as the switching technique according to an embodiment of the present disclosure is applied.

Further, the steps of the method or algorithm described in connection with the example embodiments disclosed herein may be implemented in the form of program instructions that may be executed by various computer implementations, such as microprocessors, processors, central processing units (CPUs), or the like, and retrieved/recorded from/on a computer-readable medium. The computer-readable medium may include, solely or in combination, program (instruction) codes, data files, data structures, and the like.

What is claimed is:

1. A power factor correction (PFC) circuit switching method for reducing a leakage current, the method comprising:

coupling a PFC circuit and AC power to enable a controller to perform an initial charging operation on an output capacitor to firstly increase an output capacitor voltage;

enabling the controller to secondly increase the output capacitor voltage in response to whether the firstly-increased output capacitor voltage reaches a first preset reference voltage; and enabling the controller to switch first and second poles configured in the PFC circuit at different duty ratios in response to whether the secondly-increased output capacitor voltage reaches a second preset reference voltage.

2. The method of claim 1, wherein the output capacitor voltage is firstly increased by electrically conducting anti-parallel diodes of first to fourth switching elements configured on the first and second poles to increase the output capacitor voltage.

3. The method of claim 2, wherein the output capacitor voltage is secondly increased by:

enabling the controller to check whether the firstly-increased output capacitor voltage reaches the first preset reference voltage; and as a result of the check, if the firstly-increased output capacitor voltage reaches the first preset reference voltage, enabling the controller to alternately operate all of first to fourth switching elements configured on the first and second poles at a variable duty ratio.

4. The method of claim 3, wherein enabling the controller to switch the first and second poles at a variable duty ratio comprises:

enabling the controller to check whether the secondly-increased output capacitor voltage reaches the second preset reference voltage; and as a result of the check, if the secondly-increased output capacitor voltage reaches the second preset reference voltage, enabling the controller to be coupled to an alternating current (AC) input terminal Live to alternately operate the first and second switching elements configured on the first pole at the variable duty ratio.

5. The method of claim 4, wherein the alternately operating of the first and second poles at different duty ratios comprises enabling the controller to be coupled to an AC input terminal Neutral to alternately operate the third and fourth switching elements configured on the second pole at a fixed preset duty ratio.

6. The method of claim 1, wherein a first control command for the first pole is a 0° to 360° sinusoidal wave and a second control command for the second pole is a constant voltage.

7. The method of claim 1, wherein a first pole voltage of the first pole is a 0° to 360° sinusoidal wave and a second pole voltage of the second pole is a constant voltage.

8. The method of claim 7, wherein the first pole voltage of the first pole is a voltage between a first node on the first pole and a third node on an output terminal of the PFC circuit.

9. The method of claim 7, wherein the second pole voltage of the second pole is a voltage between a second node on the second pole and a third node on an output terminal of the PFC circuit.

10. The method of claim 1, wherein the output capacitor voltage firstly generated by an output terminal of the PFC circuit or the firstly generated output capacitor voltage is a sum of a voltage of a top Y-capacitor configured on top of an output terminal of the second pole and a voltage of a bottom Y-capacitor configured on the bottom of the output terminal of the second pole.

11. The method of claim 10, wherein the leakage current is an AC input-side low-frequency common-mode leakage current and is calculated using a Kirchhoff's voltage law (KVL) loop including the bottom Y-capacitor, an inductor connected to a second node formed on the second pole, the second node, a third node representing a center of the output terminal of the PFC circuit, and the bottom Y-capacitor.

12. The method of claim 1, wherein the PFC circuit is a bridgeless PFC circuit.

13. A power factor correction (PFC) circuit switching method for reducing a leakage current, the method comprising:

after an alternating current (AC) power source is connected to a PFC circuit switching device, wherein the PFC circuit switching device comprises a charger and a controller, performing, by the controller, an initial charging operation of an output capacitor of the charger to firstly increase an output capacitor voltage by anti-parallel diodes of first to fourth switching elements being electrically conducted in the charger;

checking, by the controller, whether the firstly increased output capacitor voltage of the charger exceeds a first reference voltage;

in response to the firstly increased output capacitor voltage exceeding the first reference voltage, performing, by the controller, a high-speed switching operation of tens of kHz for both first and second poles of the charger to secondly increase the output capacitor voltage of the output capacitor of the charger;

checking, by the controller, whether the secondly increased output capacitor voltage of the charger exceeds a second reference voltage; and in response to the secondly increased output capacitor voltage exceeding the second reference voltage, switching, by the controller, the first and second poles of the charger at different duty ratios.

14. The method of claim 13, wherein the switching of the first and second poles of the charger at different duty ratios comprises:

alternately operating the first and second switching elements connected to a live AC input terminal of the AC power source at a variable duty ratio; and alternately operating the third and fourth switching elements connected to a neutral AC input terminal of the AC power source at a fixed duty ratio.

15. The method of claim 13, wherein the output capacitor includes a top Y-capacitor and a bottom Y-capacitor.

16. A system for charging a battery for a vehicle, comprising:

a charger configured to couple between an alternating current (AC) power source and the battery of the vehicle; and a controller coupled to the charger, wherein the controller is configured to control the charging of the battery from the AC power source via the charger, and wherein the controller is configured to:

perform an initial charging operation on an output capacitor of the charger to firstly increase an output capacitor voltage of the charger, secondly increase the output capacitor voltage of the charger at a variable duty ratio in response to the firstly-increased output capacitor voltage reaching a first preset reference voltage, and switch first and second poles in a power factor correction (PFC) circuit of the charger at different duty ratios in response to the secondly-increased output capacitor voltage reaching a second preset reference voltage.

17. The system of claim 16, wherein the firstly increase of the output capacitor voltage comprises electrically conducting anti-parallel diodes of first to fourth switching elements configured on the first and second poles of the charger to increase the output capacitor voltage, and wherein the secondly increase of the output capacitor voltage comprises alternately operating all of the first to fourth switching elements configured on the first and second poles at the variable duty ratio.

18. The system of claim 17, wherein the switching of the first and second poles at different duty ratios comprises:

alternately operating the first and second switching elements configured on the first pole at the variable duty ratio; and alternately operating the third and fourth switching elements configured on the second pole at a fixed duty ratio.

19. The system of claim 16, wherein the output capacitor voltage firstly generated by an output terminal of the PFC circuit or the firstly generated output capacitor voltage is a sum of a top Y-capacitor voltage of a top Y-capacitor configured on top of an output terminal of the second pole and a bottom Y-capacitor voltage of a bottom Y-capacitor configured on the bottom of the output terminal of the second pole, and wherein a leakage current is an AC input-side low-frequency common-mode leakage current and is calculated using a Kirchhoff's voltage law (KVL) loop including the bottom Y-capacitor, an inductor connected to a second node formed on the second pole, the second node, a third node representing a center of the output terminal of the PFC circuit, and the bottom Y-capacitor.

20. The system of claim 16, wherein the PFC circuit is a bridgeless PFC circuit.

* * * * *